Dec. 8, 1936.   A. R. THOMAS   2,063,276
ABSORPTION TYPE REFRIGERATING SYSTEM
Filed May 25, 1932   4 Sheets-Sheet 4
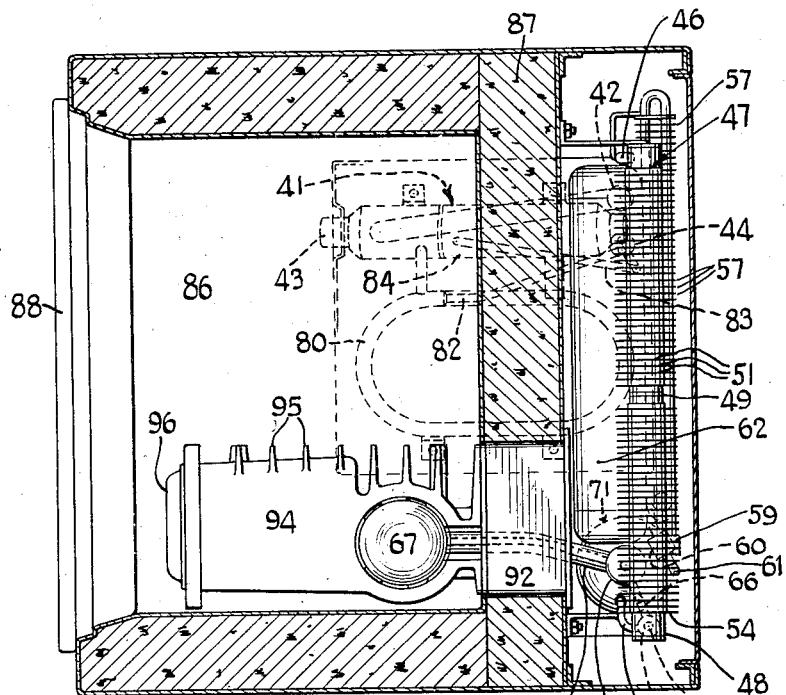
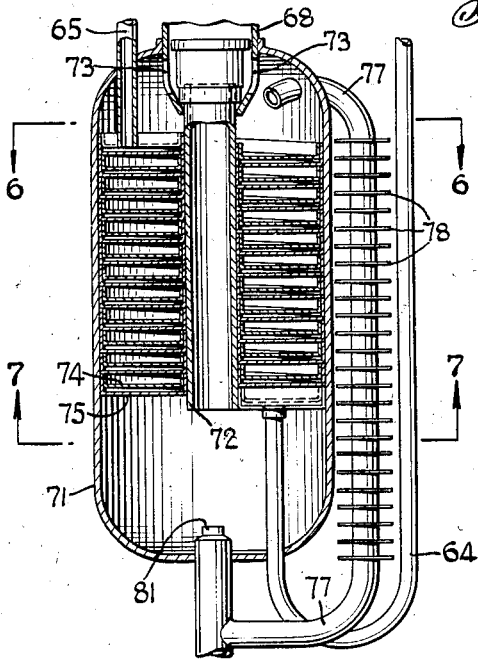
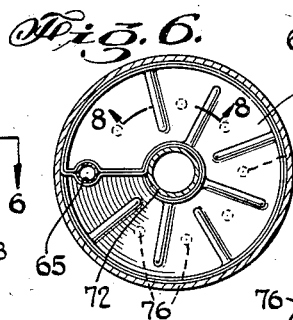
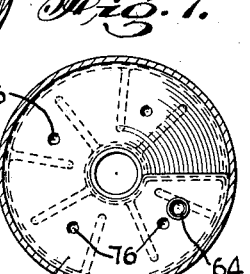
INVENTOR.
Albert R. Thomas
BY
ATTORNEY Patented Dec. 8, 1936

2,063,276

UNITED STATES PATENT OFFICE 2,063,276

ABSORPTION TYPE REFRIGERATING SYSTEM

Albert R. Thomas, New York, N. Y., assignor, by mesne assignments, to Servel, Inc., Dover, Del., a corporation of Delaware Application May 25, 1932, Serial No. 613,387

21 Claims. (Cl. 62—119.5)

This invention relates to refrigeration and more particularly to refrigerating systems of a uniform pressure absorption type for household refrigerators.

A refrigerator of this type includes a generator, a condenser, an evaporator, and an absorber connected in open fluid communication for circulation of a refrigerant fluid. The connections between the generator and absorber are arranged for circulation therebetween of a liquid absorbent for the refrigerant fluid. The connections between the evaporator and absorber are arranged for circulation therebetween of an inert pressure equalizing gas. Refrigerant vapor is expelled from solution by heat in the generator. The vapor is liquefied in the condenser, and the liquid refrigerant flows from the condenser to the evaporator by gravity. For this reason, it has heretofore been necessary to locate the condenser at a level above that of the evaporator. It is desirable to locate the evaporator in the top of a refrigerator storage compartment for cooling air therein with natural circulation. The generator is a high temperature input portion of the system. The evaporator is a low temperature heat input or refrigerating portion of the system. The condenser and absorber are heat rejecting portions of the system and provision must be made for dissipating the heat from these portions to an available cooling medium, the most common being air and water.

It is an object of my invention to provide a refrigerator of this type having an air-cooled condenser extending below the evaporator and by which either or both the heat of condensation and heat of absorption is dissipated.

Another object of the invention is to provide a refrigerator of this type having an air-cooled condenser which extends below the evaporator and therefore may be suitably located below the top of a refrigerator storage compartment in which the evaporator is located in the upper part thereof.

A further object is to provide a refrigerator of this type having means for cooling the absorber including a condenser extending below the level of the evaporator.

A still further object of the invention is to provide an internal absorber cooling element which is not subjected to unequal pressures.

In accordance with my invention, I provide for upward flow of liquid refrigerant to the evaporator which may therefore be located above the level of liquid formed in the condenser. This may be done, for instance, by vapor-lift action, utilizing the heat of absorption thereby also providing for cooling of the absorber. In an apparatus embodying the invention, I arrange one portion within another portion thereof for the purpose of transferring heat from the latter and also permitting the former to be constructed and arranged without reference to mechanical strength since it is subjected to equal inner and outer pressures. For instance, I locate a conduit for conveying liquid refrigerant from the condenser to the evaporator inside of the absorber whereby, being subjected to equal inner and outer pressures, this conduit may be fabricated of thin sheet metal and suitably arranged for efficient thermal transfer.

The nature of my invention and the objects and advantages thereof will be more fully understood from the following description taken in connection with the accompanying drawings, in which, Fig. 1 shows schematically a refrigerating system contemplated by this invention;

Figure 2:
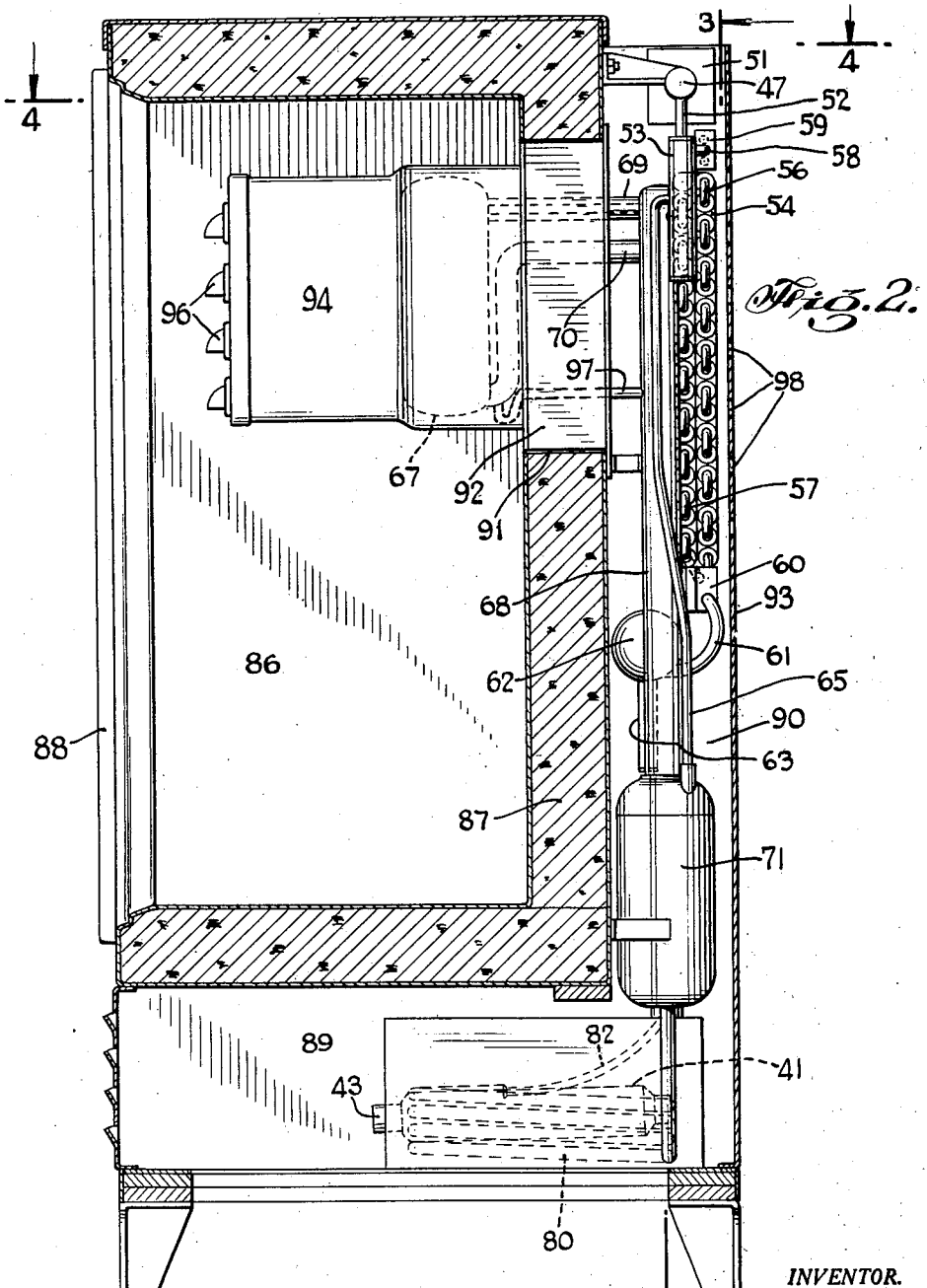
Fig. 2 shows in side elevation a refrigerating apparatus contemplated by this invention mounted in a refrigerator cabinet shown in vertical section.

Fig. 4, a section taken on line 4—4 in Fig. 2 showing a plan view of the refrigerating apparatus;

Fig. 5, a detail view of the absorber in vertical section;

Fig. 6, a section of the absorber taken on line 6—6 in Fig. 5;

Fig. 7, a detail of the absorber taken on line 7—7 in Fig. 5; and

Fig. 8, a section taken on line 8—8 in Fig. 6.

Figure 1:
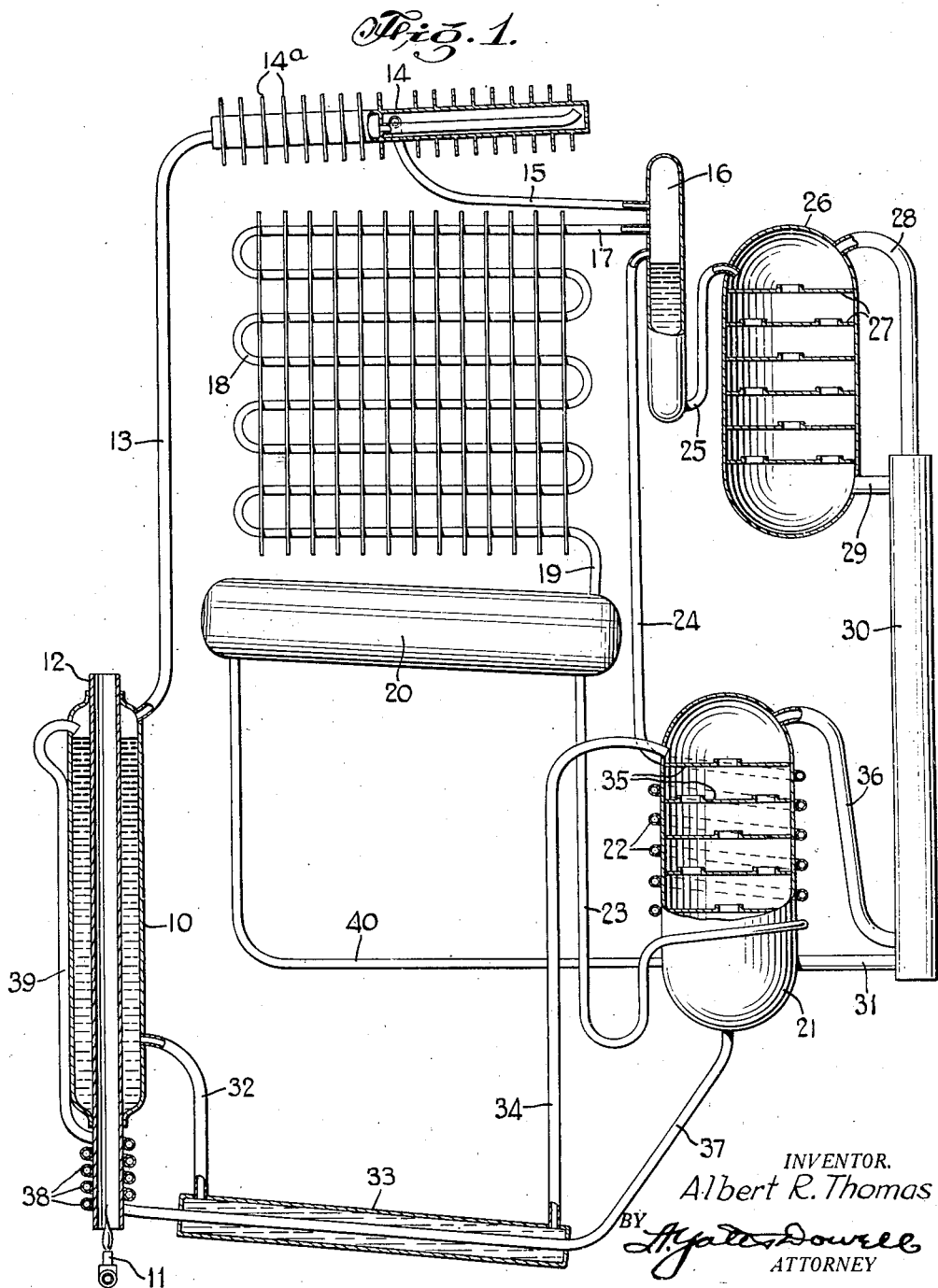

Referring to Fig. 1 of the drawings, a generator 10 containing a solution of refrigerant in an absorption liquid such as ammonia in water is heated by a gas burner 11 projecting its flame into a flue 12 which extends upwardly through the generator. Ammonia gas expelled from solution by heat in the generator passes through conduit 13 to a rectifier 14 provided with cooling means such as heat radiating fins 14ª. In the rectifier, water vapor, which may accompany the ammonia gas, condenses out and flows back to the generator through conduit 13.

From the rectifier 14, ammonia gas and the overflow of ammonia from the rectifier reflux jacket passes through conduit 15 to a separating chamber 16. From the latter, ammonia gas passes through conduit 17 into a condenser 18 which is suitably cooled, as by ambient air. Ammonia which condenses to liquid in the condenser flows through conduit 19 into the lower end of the pressure vessel 20 which is shown as an elongated closed container slightly tilted toward one end and which provides the situs of condenser liquid level.

An absorber 21 of a type well known in the art is provided with a cooling coil 22 having its lower end connected through conduit 23 to the lower end of the pressure vessel 20 and its upper end connected through conduit 24 to the separating chamber 16. Liquid ammonia from the pressure vessel 20 flows through conduit 23 into the cooling coil 22 where it is heated and raised by vapor-lift action through conduit 24 into the separating chamber 16. The heating of ammonia in the cooling coil 22 correspondingly cools the absorber 21, thereby eliminating the necessity of secondary means for cooling this part. From the separating chamber 16, the lifting vapor returns through conduit 17 to the condenser 18 where it is again condensed to liquid and the cycle repeated.

Liquid ammonia accumulates in the lower part of the separating vessel 16 from where it overflows through a liquid trap conduit 25 into the upper part of the evaporator 26. In the latter, the liquid ammonia flows downwardly over baffle plates 27 and evaporates by diffusion into an inert gas such as hydrogen which enters the top of the evaporator through conduit 28. The resulting heavier gas mixture leaves the evaporator through conduit 29 and flows through the gas heat exchanger 30 and conduit 31 into the lower part of the absorber 21.

Weak absorption liquid from which ammonia has been expelled in the generator flows by gravity through conduit 32, liquid heat exchanger 33, and conduit 34 into the upper part of the absorber 21 where it flows downwardly over baffle plates 35, absorbing ammonia out of the inert gas. The latter passes from the top of the absorber through conduit 36, heat exchanger 30, and conduit 28 back to the evaporator.

Enriched absorption liquid accumulates in the lower part of the absorber 21 from where it flows in conduit 37 through the liquid heat exchanger 33 to the heated portion 38 of a vapor-lift conduit 39, through which the liquid is raised into the generator 10 in a manner well known in the art.

The higher end of the pressure vessel 20 is vented through conduit 40 to the gas space in the absorber 21. If for any reason the absorber cooling system fails, condensate from the condenser will drain through the pressure vessel and conduit 40 into the absorption liquid circulating system between the absorber and generator. The pressure vessel 20 functions to adjust the pressure in the system, so that all of the condenser will be used at low ambient temperatures, by storing an excess of pressure equalizing fluid, hydrogen, when operating conditions are normal. When the pressure in the system increases, the stored hydrogen is circulated in the system. For a more detailed description of such a pressure chamber, reference may be had to Patent No. 1,822,224 to Donald B. Knight.

This system constitutes an improvement over that disclosed in Patent No. 1,849,685 to Carl Georg Munters, principally in that the condenser is extended below the evaporator, which is made possible by extending the vapor-lift conduit from the absorber cooling element above the condenser liquid level.

Figure 3:
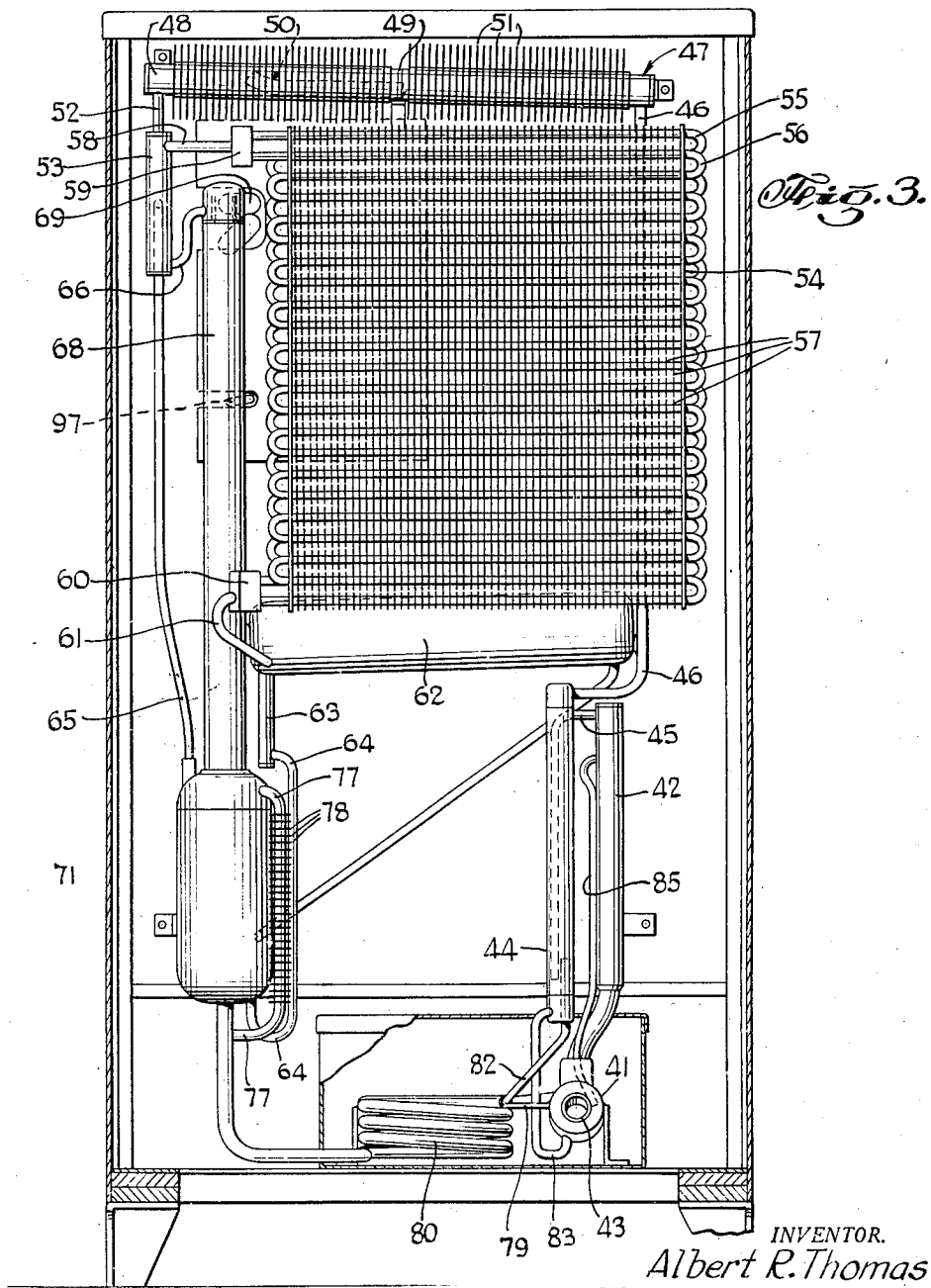
Fig. 3 is a section taken on line 3—3 in Fig. 2 showing the refrigerating apparatus in rear elevation.

The advantage of this system in permitting the condenser to be suitably located when used in a household refrigerator, is clearly apparent in Figs. 2 and 3 which show a refrigerating apparatus contemplated by this invention assembled with a cabinet. This apparatus is connected to form the system described in connection with Fig. 1. However, in this apparatus the generator 41 is of the horizontal type provided with a standpipe 42. For a detailed explanation of this type of generator, reference may be had to Patent 1,830,203 to Lenning. The horizontal portion of the generator 41 is heated by a flue 43 adapted to receive a gas burner or the like. As best shown in Fig. 3, this apparatus is also provided with an analyzer 44, which contains strong absorption liquid as hereinafter described.

Ammonia gas from the generator passes through conduit 45 into the analyzer 44 where it bubbles upwardly through the enriched absorption liquid. Ammonia gas passes from the upper end of the analyzer 44 through conduit 46 to the rectifier 47.

This rectifier comprises a closed tube 48 forming the highest part of the system and slightly upwardly inclined from the end to which the conduit 46 from the analyzer 44 is connected. The tube 48 is transversely divided by a partition 49 into upper and lower chambers. A conduit 50 from the lower rectifier chamber extends through the partition 49 upwardly within and along the bottom of the upper chamber terminating with an upturned opening therein. The tube 48 is provided throughout its length with heat radiating fins 51.

Gas from the analyzer 44 passing through conduit 46 enters the lower chamber of the rectifier 47 where, due to the removal of heat by radiation, water vapor is condensed out of the ammonia gas and drains back to the analyzer through conduit 46. From the lower chamber, gas flows through conduit 50 into the upper chamber and thence through conduit 52 into the separating vessel 53. In the upper chamber of the rectifier 47, some condensation takes place, the liquid collecting in this chamber around conduit 50 to the level of the opening of conduit 52. Due to the cooling effect of this liquid, further rectification of the gas takes place in conduit 50, the resulting condensate flowing back through the lower chamber and conduit 46 to the analyzer 44.

The condenser 54 comprises parallel pipe coils 55 and 56 arranged in the form of a grid and provided with heat radiating fins 57. The upper part of the separating vessel 53 is connected to the upper ends of the condenser coils 55 and 56 through conduit 58 and a T connection 59. The lower ends of the condenser coils 55 and 56 are connected through a T 60 and conduit 61 to the lower end of pressure vessel 62. The latter is provided at its lower end with a liquid well or sump 63. The lower part of this well is connected through conduit 64 to the lower end of the absorber cooling coil which is located within the absorber, as hereinafter described, and the upper end of the absorber cooling coil is connected through the vapor-lift conduit 65 back to the separating vessel 53.

Ammonia vapor from the rectifier 47 flows through conduit 52, the upper part of the separating vessel 53, and conduit 58 into the condenser 54. Liquid ammonia from the condenser flows from the lower end through conduit 61, pressure vessel 62, well 63, and conduit 64 to the absorber cooling coil hereinafter described. From the latter, vapor and liquid pass upwardly through the vapor-lift conduit 65 to the separating vessel 53. From the latter, the gas again flows to the condenser through conduit 58 and the cycle is repeated.

From the lower part of the separating vessel 53 liquid ammonia overflows through conduit 66 to the evaporator 67 shown in Figs. 2 and 4. The conduit 66 extends through the gas conduit 69 into the evaporator. In the latter, the liquid ammonia evaporates by diffusion into the pressure equalizing gas, hydrogen, which enters through conduit 69. The resulting gas mixture flows from the lower part of the evaporator through conduit 70 to the gas heat exchanger 68 through which it flows downwardly to the lower part of the absorber 71. Unevaporated liquid flows to the absorber through a drain pipe 97 and the heat exchanger 68.

Referring to Fig. 5 of the drawings, the absorber 71 comprises a closed casing into the upper end of which is set the lower end of the gas heat exchanger 68. The inner conduit 72 of the gas heat exchanger extends downwardly into the lower part of the absorber where it discharges rich gas from the evaporator. The outer conduit of the heat exchanger 68 communicates with the upper part of the absorber through apertures 73 for the return of weak gas to the evaporator. In the annular space between the absorber casing and the inner conduit 72 of the gas heat exchanger is positioned a hollow spiral baffle formed of spaced metal sheets 74 and 75 welded together at their upturned edges, which latter serve to space the turns of the spiral. The sheets 74 and 75 may be spot welded at various points 76 along their length as shown in Figs. 6 and 7. Conduit 64 for liquid ammonia from the condenser is connected to the lower end of the hollow baffle and the lower end of the thermo-siphon conduit 65 is connected to the upper end of the hollow spiral baffle.

In the above absorber construction it is apparent that the entire surface of the absorber baffle is directly cooled by the evaporation of liquid refrigerant, thereby allowing a greater transfer of the heat of absorption to the cooling liquid than with the usual coil around the casing. The baffle construction is made possible by this invention since, being parts of the same equalized pressure system, the pressures within the baffle and in the absorber are substantially the same, wherefore it is not necessary to have the cooling liquid conduit of circular cross section to withstand the difference in pressure as when a secondary cooling fluid is used.

Referring particularly to Figs. 3 and 5, weak absorption liquid from which gas has been expelled in the generator 41 passes through conduit 79, liquid heat exchanger 80, and conduit 77 into the upper part of the absorber 71. Conduit 77 is provided with heat radiating fins 78 for the removal of heat from the weak absorption liquid before entering the absorber. In the latter, the weak absorption liquid flows downwardly through the spiral passage in contact with and counter-flow to the rich gas, absorbing ammonia out of the latter, which returns to the evaporator through heat exchanger 68 and conduit 69. Enriched absorption liquid collects in the bottom of the absorber 71 and flows through conduit 81, liquid heat exchanger 80, and conduit 82 to the analyzer 44. From the latter the strong liquor flows through conduit 83 to the auxiliary section 84 of the generator shown in dotted outline in Fig. 4, from where it is raised through the vapor-lift conduit 85 into the generator standpipe 42, shown best in Fig. 3, and the cycle is repeated.

Referring again to Figs. 3 and 5, liquid ammonia in the hollow baffle in absorber 71 is vaporized by the heat of absorption and the resulting vapor lifts liquid ammonia through the vapor-lift conduit 65, in a well known manner, to the separating vessel 53 and the cycle is repeated as above described.

Referring particularly to Figs. 2 and 4, the above described apparatus is shown mounted in a refrigerator cabinet. The latter comprises a storage compartment 86 enclosed by heat insulated walls 87 and accessible by means of a door 88. Below the storage compartment 86 is an apparatus compartment 89 from the rear of which a flue 90 extends upwardly to the top of the cabinet. The horizontal portion of the generator 41 and the liquid heat exchanger 80 are located in the lower apparatus compartment and the other parts of the apparatus previously described are located in the vertical flue 90 with the exception of the evaporator 67 which is located within the insulated storage compartment 86. The rear wall of the latter is provided with an aperture or window opening 91 in which fits a removable closure member comprising a heat insulated wall section 92. The connections to the evaporator extend through the closure member 92, wherefore the refrigerating apparatus including the evaporator may be removed as a unit from the cabinet by removing the rear wall 93 of the flue 90.

When a tank type evaporator 67 is used, as shown in Figs. 2 and 4, there is provided a so-called chilliator 94 which is preferably an aluminum casting formed with heat radiating fins 95 and recesses for water freezing trays 96. This casting is bolted or otherwise secured in substantial thermal contact with the evaporator.

The bottom of the apparatus compartment 89 may be entirely open or provided with suitable openings so that air may enter the lower part of flue 90 in which it cools the heat rejecting parts of the apparatus. Upward circulation of air is induced due to the difference in weights of the heated column of air in the flue 90 and an equal column of cool air outside. To insure an adequate supply of air to the condenser in this arrangement, the rear wall 93 of the flue may be provided with a large opening, directly opposite the condenser, or a plurality of apertures 98, as shown in Fig. 2.

It will be obvious to those skilled in the art that various other changes may be made in the construction and arrangement without departing from the spirit of the invention and therefore the invention is not limited to what is shown in the drawings and described in the specification but only as indicated in the following claims.

I claim:

1. The method of refrigerating with an absorption system of the pressure equalized type having the evaporator above the liquid level in the condenser which includes utilizing heat of absorption to raise cooling liquid from the condenser level to the evaporator level.

2. The method of refrigerating with a continuous absorption system of the pressure equalized type having the evaporator above the liquid level in the condenser, which includes utilizing heat of absorption to raise the cooling liquid from the condenser level to the evaporator level, and conducting the vapor produced in such action back to the condenser.

3. Refrigerating apparatus comprising a generator containing a solution of refrigerant in an absorption liquid and an absorber interconnected with the generator for the circulation of absorption liquid therebetween, an evaporator interconnected with said absorber for the circulation of an inert gas therebetween, a condenser extending below said evaporator, a gas and liquid separating vessel having a liquid trap overflow connection to said evaporator, a conduit for vapor from said generator to said vessel, a conduit for vapor from said vessel to said condenser, and a vapor-lift conduit arranged in heat exchange relation with said absorber connected to receive liquid from said condenser and discharge liquid and gas into said separating vessel.

4. Refrigerating apparatus comprising a generator containing a solution of refrigerant in an absorption liquid and an absorber interconnected with said generator for the circulation of absorption liquid therebetween, an evaporator interconnected with said absorber for the circulation of an inert gas therebetween, a condenser extending below said evaporator, vapor-lift means for raising liquid from said condenser to said evaporator, and means to conduct vapor produced in said generator and said vapor-lift means to said condenser.

5. Refrigerating apparatus comprising a generator containing a solution of refrigerant in an absorption liquid and an absorber interconnected for the circulation of absorption liquid therebetween, an evaporator interconnected with said absorber for the circulation of an inert gas therebetween, a condenser extending below said evaporator and connected to receive refrigerant vapor from said generator, and heat operated means to both cool said absorber and raise liquid refrigerant from said condenser to said evaporator.

6. Refrigerating apparatus of the class described including an absorber, an evaporator, a condenser extending below said evaporator, and means utilizing heat from said absorber to raise liquid from said condenser to said evaporator.

7. Refrigerating apparatus of the class described including an absorber, an evaporator, a condenser extending below said evaporator, a member in heat exchange relation with said absorber connected to receive liquid from said condenser, a rising vapor-lift conduit from said member, and a separating vessel connected to receive vapor and liquid from said rising conduit and distribute the same respectively to said condenser and said evaporator.

8. Refrigerating apparatus comprising an absorber, a generator containing a solution of refrigerant in an absorption liquid and interconnected with said absorber for the circulation of absorption liquid therebetween, an evaporator interconnected with said absorber for the circulation of an inert gas therebetween, a hollow member outwardly defining a tortuous passageway for absorption liquid and gas in said absorber, a vapor-lift conduit extending upwardly from said hollow member, a condenser extending below said evaporator and connected in the system to supply liquid refrigerant within said hollow member and receive refrigerant vapor from said generator and said upwardly extending conduit, and means to conduct liquid raised through said upwardly extending conduit to said evaporator.

9. Refrigerating apparatus of the class described including an absorber, an evaporator, a condenser extending below said evaporator, a vapor-lift conduit extending through said absorber and connected to receive liquid from said condenser, and a separating vessel connected to receive vapor and liquid from said vapor-lift conduit and distribute them respectively to said condenser and said evaporator.

10. Refrigerating apparatus of the class described including a condenser, an evaporator, an absorber, and a conduit for flow of refrigerant from said condenser to said evaporator extending through said absorber, a portion of said conduit within the absorber comprising a member with extensive heat transfer surface having a flat, wide passage therethrough.

11. The method of refrigeration with an absorption system of the pressure equalized type which includes, condensing refrigerant fluid to liquid at a first level, evaporating the liquid at a higher level, and utilizing heat of absorption to raise the liquid between said levels.

12. The method of refrigeration with an absorption system having an absorber which includes conducting liquid cooling fluid from a first liquid surface level in heat exchange relation with the absorber to cool the latter by vaporization, utilizing the vapor thus produced to lift cooling liquid to a higher surface level, and evaporating the liquid at said higher level.

13. The method of refrigeration with an absorption system which includes condensing cooling fluid vapor to liquid at a first level, evaporating the liquid at a higher level, and transferring heat of absorption in the system by vaporization of the cooling liquid from said first level, and utilizing the vapor thus produced to raise the liquid to said higher level.

14. The method of refrigeration with an absorption system of the pressure equalized type which includes condensing cooling fluid vapor to liquid by heat exchange with ambient air at a first level, transferring heat of absorption in the system by vaporization of a portion of the condensed liquid, utilizing the vapor thus produced to raise the liquid to a higher level, and evaporating the liquid at said higher level.

15. Refrigeration apparatus of the class described including a condenser, an evaporator, an absorber, a cooling element within said absorber having an extensive heat transfer surface, and a conduit for flow of refrigerant from said condenser to said evaporator including said element whereby the latter is subjected to equal inner and outer pressures and therefore requires minimum mechanical strength.

16. A refrigeration system comprising an absorber, an evaporator, a condenser extending below said evaporator, a generator, said elements being interconnected for circulation of a cooling fluid therethrough, vapor generating means for flowing liquid cooling fluid upwardly from said condenser to said evaporator, and means for returning to said condenser vaporous cooling fluid produced in said first means.

17. Refrigeration apparatus for circulating a cooling fluid through an absorption-expulsion-condensation-evaporation cycle at uniform total pressure including a cooling element within that part of the apparatus forming the absorption phase of the cycle and connected to convey condensed cooling fluid in the path of flow between the condensation and evaporation phases of the cycle, whereby said element is subjected to equal inner and outer pressures and therefore requires minimum mechanical strength.

18. An absorption type refrigerator including an evaporator, an absorber, conduits connecting said evaporator and absorber for circulation of inert pressure equalizing gas therebetween means for conducting liquid refrigerant to said evaporator, a member for cooling said absorber, a condenser extending below said evaporator, and conduits connecting said member and said condenser for circulation of fluid therebetween.

19. An absorption type refrigerator including a cabinet having a thermally insulated storage compartment and an apparatus compartment having a portion at one side of the storage compartment, refrigeration apparatus including an evaporator in the upper part of said storage compartment, an absorber in said apparatus compartment, conduits in mutual heat exchange relation and connecting said evaporator and absorber for circulation of inert pressure equalizing gas therebetween, a member adapted to contain fluid in thermal exchange relation with said absorber, a condenser comprising a finned pipe coil in said part of the apparatus compartment at one side of the storage compartment and extending below the level of said evaporator in the storage compartment, and conduits connecting said condenser and said absorber cooling member for circulation of fluid therebetween.

20. In a process of refrigerating, expelling refrigerant from solution, condensing the refrigerant, evaporating refrigerant at a level above a liquid level of condensed refrigerant, flowing condensed refrigerant upwardly to such higher level at which evaporation takes place by gas lift action, removing gas from the fluid so raised before it reaches the place of evaporation, causing the evaporation to take place in the presence of inert gas, flowing evaporated refrigerant and inert gas to the presence of absorption liquid, circulating absorption liquid between the place of absorption and the place of expulsion, and flowing inert gas to the place of evaporation.

21. In a process of refrigerating, expelling refrigerant from solution, condensing refrigerant, evaporating refrigerant at a level above a liquid level of condensed refrigerant, heating condensed refrigerant to cause it to flow upwardly to such higher level at which evaporation takes place, causing evaporation to take place in the presence of inert gas, flowing evaporated refrigerant and inert gas to the presence of absorption liquid, circulating absorption liquid between the place of absorption and the place of expulsion, and flowing inert gas to the place of evaporation.

ALBERT R. THOMAS.